United States Patent [19]
Feinberg

[11] Patent Number: 5,262,887
[45] Date of Patent: Nov. 16, 1993

[54] RASTER OUTPUT SCANNER ARCHITECTURE EMPLOYING ROTATING PRISM FACET TRACKING

[75] Inventor: Amatzia Feinberg, Los Angeles, Calif.

[73] Assignee: Xerox Corporation, Stamford, Conn.

[21] Appl. No.: 975,297

[22] Filed: Nov. 12, 1992

[51] Int. Cl.⁵ .............................................. G02B 26/08
[52] U.S. Cl. ..................................... 359/211; 359/216; 250/236
[58] Field of Search ......................... 359/209–211, 359/216–219, 557, 837; 250/236

[56] References Cited

U.S. PATENT DOCUMENTS

| | | | |
|---|---|---|---|
| 2,543,463 | 2/1951 | Malm | 178/7.1 |
| 3,511,551 | 5/1970 | Matulka | 359/209 |
| 4,300,160 | 11/1981 | Pusch et al. | 359/211 |
| 4,717,823 | 1/1988 | Steimel et al. | 359/211 |

Primary Examiner—Martin Lerner
Assistant Examiner—James Phan
Attorney, Agent, or Firm—Fariba Rad

[57] ABSTRACT

A raster scanning system is disclosed which utilizes a rotating prism for facet tracking. The rotating prism has a plurality of facets and each facet is parallel to an opposite facet. A light beam enters through one facet of the rotating prism and exits the corresponding parallel facet. The light beam passing through the rotating prism deflects and since the the prism rotates the light beam also shifts. The prism shifts the light beam in such a manner to keep the beam at the center of a mirror facet of a rotating polygon mirror.

4 Claims, 2 Drawing Sheets

RASTER OUTPUT SCANNER ARCHITECTURE EMPLOYING ROTATING PRISM FACET TRACKING

DESCRIPTION OF THE PREFERRED EMBODIMENT

This invention relates to a raster scanning system and, more particularly, to a raster scanning system which reduces the nonuniformity of the intensity of the light beam by utilizing a rotating prism for facet tracking.

Other objects will become apparent from the following description with reference to the drawings wherein.

Figure 1:
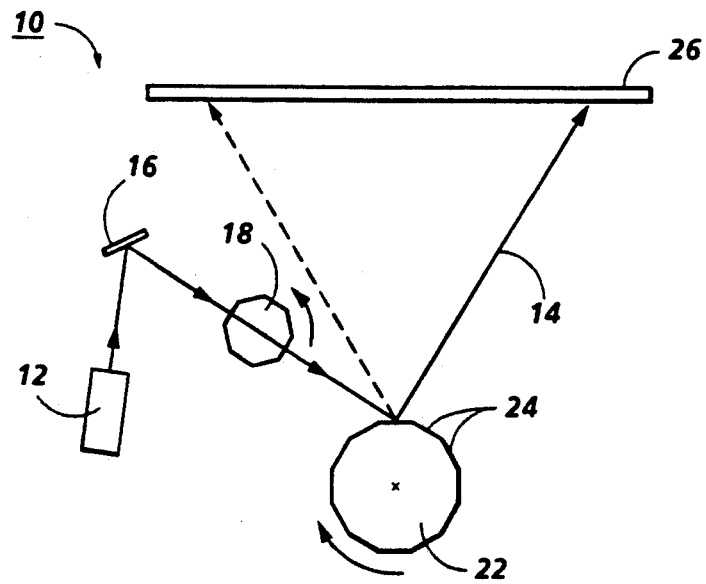
FIG. 1 is a schematic view of a raster scanning system incorporating a rotating prism for facet tracking.

A conventional raster scanning system utilizes a light source, a modulator and a multi-faceted rotating polygon mirror as a scanning element. The light source, which can be a laser source, emits a light beam and sends it to a modulator. The modulator receives pixel information for modulating the light beam. The modulated light beam will be directed onto a rotating polygon mirror. The rotating polygon mirror reflects the light beam and also causes the reflected light to revolve about an axis near the center of rotation of the rotating polygon and scan a straight line. This reflected light beam can be utilized to scan a document at the input of an imaging system or can be used to impinge upon a photographic film or a photosensitive medium, such as a xerographic drum at the output of the imaging system.

Many of the conventional raster scanning systems exhibit a modulated light beam which has a varying intensity over one scan line. For instance, the modulated light beam at the start of the scan line and at the end of the scan line has less intensity that at the center of the scan line. If the intensity variation (difference between the highest intensity and the lowest intensity) becomes more than a certain specified limit, it can be observed on the printed document as lighter prints at the edges of the document and as darker prints at the center of the document. The problem comes mainly from a facet tracking feature used in the modulators. Facet tracking is a feature of an underfilled scanning system that shifts the beam while the mirror facet is rotating in order to keep the beam at the center of the mirror facet.

A piezoelectric transducer in the modulator resonates thus, shifting the beam to track the center of the mirror facet. The transducer utilizes a variable carrier frequency which gradually increases as the beam moves from the start of the scan line to the end of the scan line. This frequency causes the transducer to oscillate and as the frequency increases the frequency of the oscillation also increases. The increasing frequency of the transducer's oscillation causes the beam to shift while it is deflected by a Bragg cell. However, from basic mechanics, a transducer performs best at its resonant frequency. As the frequency changes and moves away from the resonant frequency, the performance of the transducer degrades and therefore the intensity of the reflected beam decreases.

Typically, the transducers are fabricated to have a resonant frequency at the mid range of the variable frequency which is at the center of the scan line. Therefore, at the start and at the end of the scan line, the performance of the transducer is less than the peak performance of the transducer which is at the center of the scan line. This is the main cause of the nonuniformity of the intensity of the beam since the light is being deflected more efficiently where the transducer is at its peak performance.

Also, conventional raster scanning systems such as tri-level, highlight color imaging, which use a high frequency for modulation, have an inherent problem called "beating". Beating occurs since the frequency used for facet tracking is close to the frequency of modulation. Beating is a phenomenon happening between two close frequencies. When beating happens at some points the amplitudes of the two waves add up to each other and at some points the amplitudes cancel each other. A beating problem on a printed document can be observed as periodic dark and light stripes.

Figure 2:
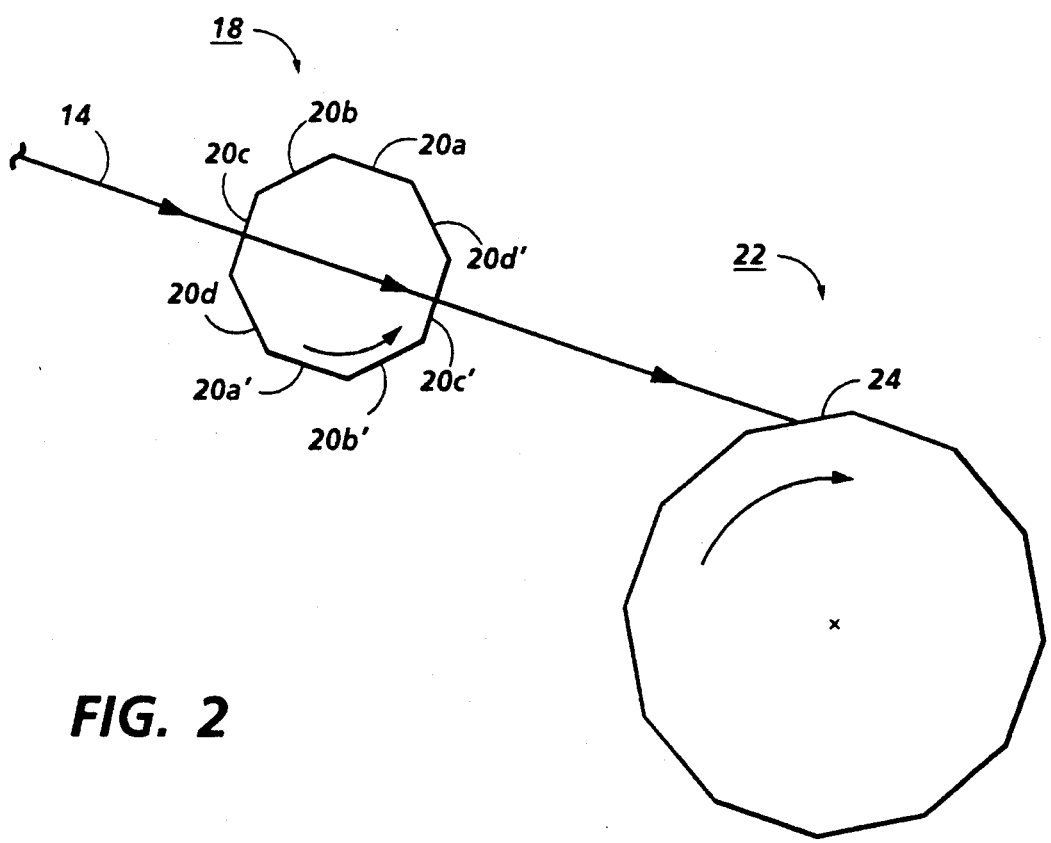
FIG. 2 is a magnified view of a portion of the raster scanning system of FIG. 1.

Referring to FIGS. 1 and 2, there is shown a raster scanning system 10 of this invention. A Helium Neon laser is used as a light source 12. The light source 12 emits a light beam 14 onto a mirror 16 which is used to reflect the light beam 14 onto a rotating prism 18. The light beam passes through the rotating prism 18 which has a plurality of facets 20a, 20b, 20c, 20a', 20b' and 20c'. Then the light beam 14 is sent out onto a rotating polygon mirror 22 which has a plurality of mirror facets 24 for reflecting the light beam 14. The reflected light revolves about an axis near the center of rotation of the rotating polygon mirror 22. This reflected light can be utilized to scan a document at the input end of an imaging system as a raster input scanner or can be used to impinge upon a photosensitive medium, such as a photoreceptor 26, in the output mode as a raster output scanner.

Figure 3:
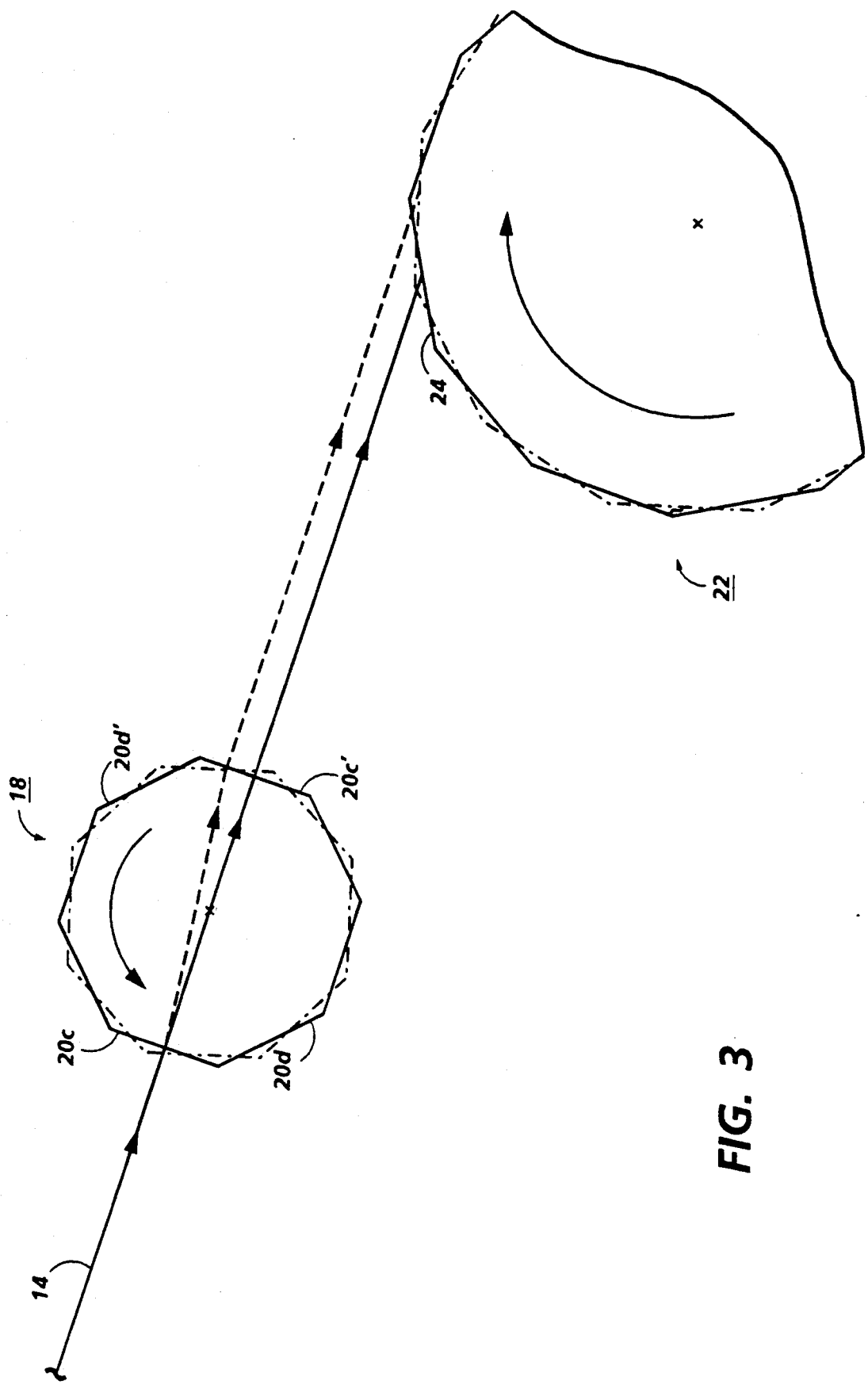
FIG. 3 is another magnified view of a portion of the raster scanning system of FIG. 1 showing the rotation of the rotating prism for shifting a light beam to track the center of a facet of a rotating polygon.

Referring to FIGS. 2 and 3, the rotating prism 18 is utilized to achieve facet tracking by shifting the beam 14 to track the center of the mirror facet 24 while the rotating polygon mirror 22 is rotating. The rotating prism 18 deflects the light beam 14. Since the prism 18 rotates, it causes the deflected light beam 14 to shift. Facets 20a, 20b, 20c and 20d are parallel to facets 20a', 20b', 20c', and 20d' respectively. The beam 14 always enters from one facet and exits from an exit facet which is parallel to the entrance facet. For example in FIG. 2, the beam 14 enters the facet 20c and exits the facet 20c'. Also, the prism 18 is designed to deflect the light in such a manner that the light beam exiting the prism 18 is always parallel to the direction of the light entering the prism 18. The rotating prism 18 rotates in the opposite direction of the rotating polygon mirror 22 in order to deflect the light in such a manner to track the center of the mirror facet 24. As one mirror facet 24 reaches the end of the scan line, the light beam 14 deflected by the rotating prism 18 reaches the end of the exit facet i.e. 20c'. Then the light beam 14 moves onto the next exit facet. This causes the light beam 14 to jump to the center of the next mirror facet 24 which will be scanning the next scan line.

The speed and the number of facets of the rotating prism 18 can be designed to match the requirements of the rotating polygon mirror 22. However, the number of the facets of the rotating prism 18 does not have to be equal to the number of the facets of the rotating polygon mirror 22.

The raster scanning system of this invention eliminates the non-uniformity of the conventional raster scanning systems. Since this system is an optically passive system and does not use any frequency for shifting the beam 14, the intensity of the light beam 14 stays uniform.

Since the facet tracking of this invention eliminates the conventional facet tracking systems and the ramp frequency used by the conventional facet tracking systems, the aforementioned problem of beating is also eliminated.

In addition, this system eliminates the requirement for a modulator with a facet tracking feature. Therefore, an electronically modulated light source, such as a laser diode, can now be used in a scanning system with the facet tracking suggested by this invention without a need for a separate modulator.

What is claimed is:

1. A raster scanning system comprising:
   a light source emitting a light beam;
   a rotating light beam shifting means rotating about a first axis,
   a rotating scanning means rotating in the opposite direction of said rotating light beam shifting means and about a second axis spaced from said first axis and generally parallel to said first axis;
   said rotating light beam shifting means being arranged to receive said light beam from said light source and send said light beam to said rotating scanning means;
   said rotating scanning means being arranged to receive said light beam from said rotating light beam shifting means and scan said light beam;
   said rotating scanning means having a plurality of facets;
   each one of said plurality of facets having a center;
   each one of said plurality of facets being arranged to successively scan said light beam during a rotation of said rotating scanning means;
   each of said facets receiving said light beam at its center when such facet is in a position to scan said light beam; and
   said rotating light beam shifting means being so constructed and arranged relative to said light source and said rotating scanning means to shift said light beam to track said center of a respective said facet as said respective facet scans said beam.

2. The raster scanning system as recited in claim 1, wherein said rotating light beam shifting means is a prism.

3. The raster scanning system as recited in claim 2, wherein said prism is transparent.

4. The raster scanning system as recited in claim 3, wherein said prism has an even number of facets, each facet of said prism has a corresponding parallel facet opposite thereto, said prism being arranged relative to said light source to receive said light beam by one of said plurality of facets of said prism and emit said light beam by a respective corresponding parallel facet of said prism.

* * * * *